United States Patent
Otsuki et al.

(10) Patent No.: US 9,632,400 B2
(45) Date of Patent: Apr. 25, 2017

(54) PROJECTOR HAVING AN EXTERIOR ENCLOSURE AND A RECEIVER DISPOSED IN A SWELLING PORTION OF THE EXTERIOR ENCLOSURE

(71) Applicant: Seiko Epson Corporation, Tokyo (JP)

(72) Inventors: Nobuyuki Otsuki, Matsumoto (JP); Haiyan Zhou, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 96 days.

(21) Appl. No.: 14/731,374

(22) Filed: Jun. 4, 2015

(65) Prior Publication Data

US 2015/0378247 A1 Dec. 31, 2015

(30) Foreign Application Priority Data

Jun. 30, 2014 (JP) ................................. 2014-133751

(51) Int. Cl.
*G03B 21/14* (2006.01)
*H04N 9/31* (2006.01)

(52) U.S. Cl.
CPC ......... *G03B 21/145* (2013.01); *H04N 9/3141* (2013.01); *G03B 2205/0046* (2013.01)

(58) Field of Classification Search
CPC .......... G03B 21/145; G03B 2205/0046; H04N 9/3141
See application file for complete search history.

(56) References Cited

U.S. PATENT DOCUMENTS

| 4,646,143 A * | 2/1987 | Watanabe | G02B 5/24 348/749 |
| 2006/0164609 A1 * | 7/2006 | Liu | G03B 9/02 353/97 |
| 2012/0257172 A1 * | 10/2012 | Shirakura | G03B 21/16 353/61 |

FOREIGN PATENT DOCUMENTS

JP 2004-207400 A 7/2004

* cited by examiner

*Primary Examiner* — Sultan Chowdhury
*Assistant Examiner* — Magda Cruz
(74) *Attorney, Agent, or Firm* — ALG Intellectual Property, LLC

(57) ABSTRACT

A projector includes a projection lens having a plurality of lenses and projects modulated light from a light modulator, a receiver that externally receives an optical signal, and an exterior enclosure that forms the exterior of the projector. The projection lens has a front-side lens disposed in a most downstream position in an optical path among the plurality of lenses and having a diameter larger than the diameters of the other lenses. The exterior enclosure has an upper surface portion. The upper surface portion has a swelling portion that swells in such a way that the swelling portion covers part of a circumferential edge portion of the front-side lens. The receiver is disposed in the swelling portion and so oriented that the receiver receives the optical signal incident from a side opposite to a side where the light is projected through the projection lens.

4 Claims, 6 Drawing Sheets

PROJECTOR HAVING AN EXTERIOR ENCLOSURE AND A RECEIVER DISPOSED IN A SWELLING PORTION OF THE EXTERIOR ENCLOSURE

BACKGROUND

1. Technical Field

The present invention relates to a projector.

2. Related Art

There is a known projector of related art that modulates light emitted from a light source in accordance with image information and projects the modulated light on a screen or any other projection surface. Further, a projector is provided with an input terminal and other components to be connected to an external apparatus, and there is a proposed projector including a cover member that covers the input terminal, a cable connected to the input terminal, and other components so that exterior appearance is improved and no dust or dirt attaches to the input terminal and other components (see JP-A-2004-207400, for example).

The cover member described in JP-A-2004-207400 (cover for electronic apparatus enclosure) has a cover body formed in a roughly box-like shape. The cover body has a cover upper surface portion, a cover side surface portion, a cover rear surface portion, and a cover bottom surface portion. The cover upper surface portion has a protruding portion formed in a roughly central portion in the width direction, and the protruding portion protrudes upward. A ridgeline portion where the cover upper surface portion and the cover side surface portion intersect each other has a recessed portion formed therein, and the recessed portion concavely retracts along the ridgeline. The recessed portion is formed in correspondence with a light receiver provided on the rear surface side of the projector, and the light receiver is capable of receiving an operation signal from an external remote control even when the cover member is attached to the projector.

However, in the projector described in JP-A-2004-207400, in which the cover member is provided with the protruding portion and the recessed portion, a step is created in a portion between an exterior case and the cover member and does not necessarily provide a good exterior appearance. Further, since a portion for forming the recessed portion of the cover member comes into contact with the rear surface of the exterior case, no connection terminal or other components can undesirably be disposed in the portion.

To avoid the problem described above, in a case where the step between the exterior case and the cover member is shortened and a hole corresponding to the light receiver is formed in the cover member, the hole needs to be large in consideration of the directivity of the light receiver, resulting in poor exterior appearance, and it is conceivable that the function of the cover member is compromised because dust readily enters externally. It is instead conceivable to insert a light transmissible member that transmits an external optical signal into the hole. This approach, however, increases the number of parts and makes it difficult to improve exterior appearance because the cover member and the light transmissible member differ from each other in terms of color and texture.

SUMMARY

An advantage of some aspects of the invention is to solve at least a part of the problems described above, and the invention can be implemented as the following aspects or application examples.

Application Example 1

A projector according to this application example is a projector including a light source, a light modulator that modulates light emitted from the light source in accordance with image information, a projection lens having a plurality of lenses and projects the modulated light from the light modulator, a receiver that externally receives an optical signal and outputs an electric signal according to the received optical signal, and an exterior enclosure that forms the exterior of the projector. The projection lens has a front-side lens disposed in a most downstream position in an optical path among the plurality of lenses and having a diameter larger than the diameters of the other lenses. The exterior enclosure has an upper surface portion that faces upward in a standing attitude of the projector. The upper surface portion has a swelling portion that swells in such a way that the swelling portion covers part of a circumferential edge portion of the front-side lens. The receiver is disposed in the swelling portion and so oriented that the receiver receives the optical signal incident from a side opposite to a side where the light is projected through the projection lens.

According to the thus configured projector, the upper surface portion of the exterior enclosure is provided with the swelling portion, which swells in such a way that it covers part of the circumferential edge portion of the front-side lens, and the receiver is disposed in the swelling portion and so oriented that the receiver receives an optical signal incident from the side opposite to the side where the projection lens performs projection. That is, assuming that the side where the projection lens performs projection is the front side, the receiver is so disposed that it receives an optical signal transmitted from a position behind the projector. As a result, even in a configuration in which an input terminal and other components are provided on the rear surface of the projector and a cable cover that covers a cable connected to the input terminal and other components is attached to the rear surface of the projector, the cable cover does not block an optical signal directed from the rear surface side toward the receiver. The projector therefore allows the receiver to reliably receive an optical signal transmitted from the rear surface side and can perform action or image projecting according to the received signal without providing the cable cover with a special shape (such as hole or recess) for optical signal reception or without configuring the cable cover by using a member that transmits an optical signal. Further, since the receiver is disposed with the aid of the swelling portion formed in correspondence with the front-side lens, the receiver can be disposed without degradation in the exterior appearance of the projector.

Application Example 2

In the projector according to the application example described above, it is preferable that the receiver is so inclined that a central axis of an area over which the receiver has a directional characteristic separates away from the projector by a greater distance as the central axis extends farther away from the swelling portion toward the opposite side.

According to the configuration described above, since the receiver is so disposed that it is inclined as described above, in an attitude in which the projector is installed on a desktop or any other surface (standing attitude), the receiver can receive an optical signal issued from an obliquely upward position behind the projector and positions therearound, whereas in an attitude in which the projector is installed on a ceiling or any other surface or in an upside-down attitude (hung attitude) instead of the standing attitude, the receiver can receive an optical signal issued from an obliquely downward position behind the projector and positions therearound.

Application Example 3

In the projector according to the application example described above, it is preferable that the receiver is attached to the projection lens.

According to the configuration described above, since the receiver is attached to the projection lens, the receiver and the projection lens can be manufactured integrally with each other and then disposed in the exterior enclosure. The projector can therefore be manufactured in a simplified manner.

Application Example 4

In the projector according to the application example described above, it is preferable that the projection lens is provided with a lever located on the side opposite to the swelling portion and used for at least one of focus adjustment and zoom adjustment, and the lever is located in a position outside a predetermined area containing a position in the directional characteristic area of the receiver where reception sensitivity is maximized.

According to the configuration described above, since the lever does not block an optical signal directed toward the area where the receiver has high reception sensitivity, the receiver can reliably receive an optical signal from the rear surface side even when focus adjustment or zoom adjustment is performed.

Application Example 5

In the projector according to the application example described above, it is preferable that the receiver preferably receives an optical signal issued from a remote control used to remotely operate the projector.

According to the configuration described above, the projector can be reliably remotely controlled through operation of the remote control performed by an image viewer who is present behind the rear surface of the projector even when the cable cover is attached to the rear surface of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a screen or any other projection surface. Further, the projector according to the present embodiment includes input terminals and other components to be connected to an external apparatus, and a cable cover that covers the input terminals, cables connected to the input terminals, and other components is detachably provided.

Principal Configuration of Projector

Figure 1:
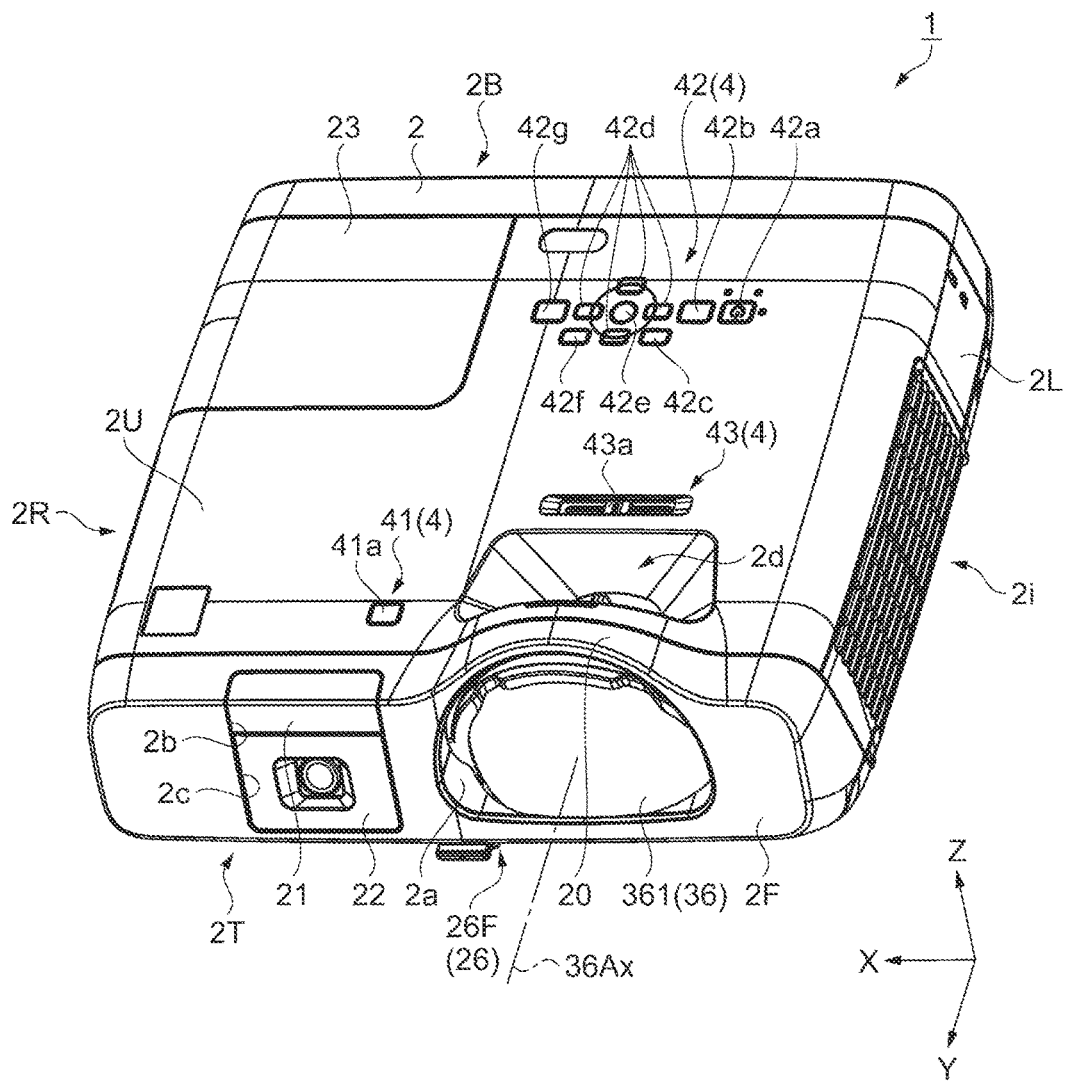
FIG. 1 is an exterior view of a projector according to an embodiment of the invention viewed from a projection surface side.
Figure 2:
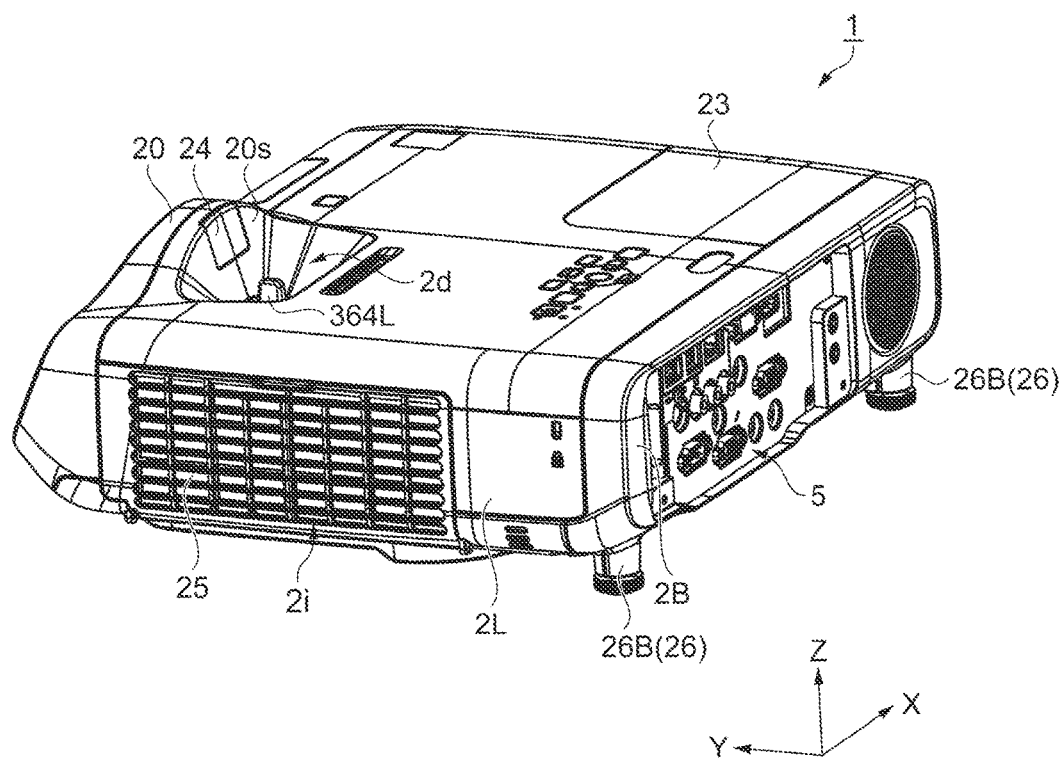
FIG. 2 is an exterior view of the projector according to the embodiment viewed from the side facing the projection surface.
Figure 3:
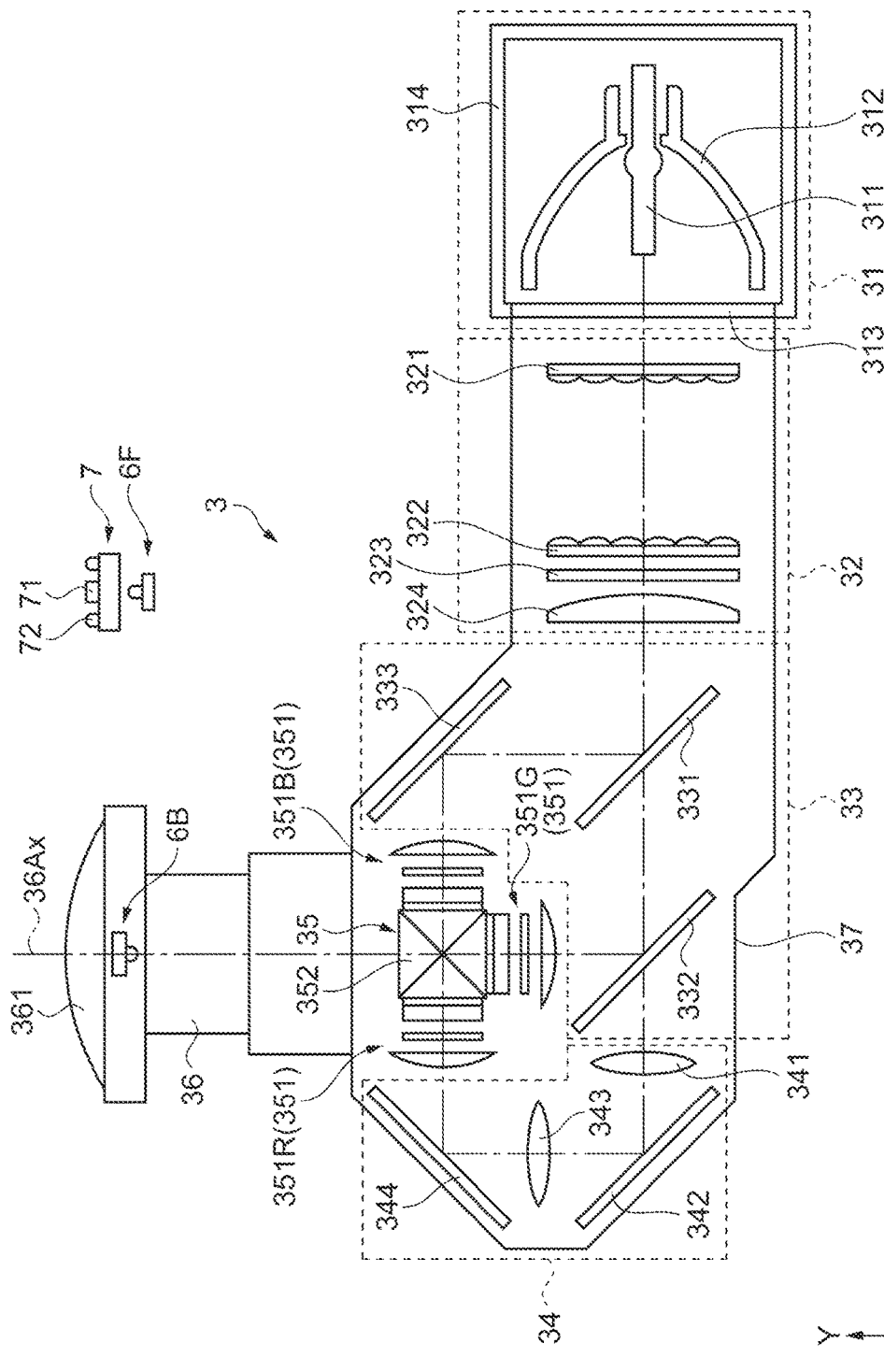
FIG. 3 is a diagrammatic view showing a schematic internal configuration of the projector according to the embodiment.

FIG. 1 is an exterior view of a projector 1 according to the present embodiment viewed from a projection surface side. FIG. 2 is an exterior view of the projector 1 viewed from the side facing the projection surface. FIG. 3 is a diagrammatic view showing a schematic internal configuration of the projector 1. In the following sections, the following definition is made for ease of description: the direction in which projection light is projected from the projector 1 is called a +Y direction (frontward direction); the upward direction in the attitude of the projector 1 installed on a desktop or any other surface (standing attitude) is called a +Z direction (upward direction); and the rightward direction with respect to the projector 1 in the standing attitude viewed from the side facing the projection surface is called a +X direction. The projector 1 is further capable of projection in the attitude of the projector installed on a ceiling or any other surface or in an upside-down attitude (hung attitude) instead of the standing attitude.

The projector 1 includes an exterior enclosure 2, which forms the exterior of the projector 1, a controller (not shown), an optical unit 3, which includes a light source apparatus 31, an input operation section 4, a plurality of input terminals 5, receivers 6F and 6B, and a detector 7, as shown in FIGS. 1 to 3. Although not shown, a cooler that cools the optical unit 3 and other components, a power supply that supplies the controller and other components with electric power, and other components are disposed in the exterior enclosure 2.

The exterior enclosure 2 is a combination of a plurality of members made of a synthetic resin and has a front surface portion 2F, an upper surface portion 2U, a left side surface portion 2L, a right side surface portion 2R, a rear surface portion 2B, and a bottom surface portion 2T, as shown in FIG. 1.

The front surface portion 2F has the following portions formed therein: a projection opening 2a, through which projection light from the optical unit 3 passes; an opening 2b for the receiver 6F; and an opening 2c for the detector 7.

The projection opening 2a is provided in a position shifted in the rightward/leftward direction (±X direction) leftward (in −X direction) from the center, and the openings 2b and 2c are formed in positions on the right (+X direction) side of the projection opening 2a with the opening 2b formed in a position above the opening 2c.

The receiver 6F (see FIG. 3) is disposed in the opening 2b, and the opening 2b is closed by a filter member 21, which transmits infrared light but blocks visible light.

The detector 7 (see FIG. 3) is disposed in the opening 2c, and the opening 2c is closed by a filter member 22, which has a hole formed at the center, transmits infrared light, but blocks visible light. The filter member 21 and the filter member 22 may instead be integrated with each other.

The upper surface portion 2U is a portion that from the upper side of the exterior enclosure 2 in the standing attitude of the projector 1. The upper surface portion 2U is provided with a swelling portion 20, which swells upward, a recessed portion 2d, a plurality of openings in which a plurality of operation keys provided in the input operation section 4 are disposed, and a lamp lid 23.

The swelling portion 20 swells in such a way that it covers part of a circumferential edge portion of a front-side lens 361, which forms a projection lens 36 and will be described later, and connects with part of the circumferential edge of the projection opening 2a. The swelling portion 20 has an inclined surface 20S, which faces rearward, and is so formed that the size in the frontward/rearward direction is smaller on the upper end side than on the base end side, as shown in FIG. 2.

The recessed portion 2d is formed in a portion behind the swelling portion 20, has a rectangular shape in a plan view, and has front, rear, right, and left sidewalls so inclined that the cross-sectional shape of the recessed portion 2d decreases with distance toward the bottom, as shown in FIG. 2. The inclined surface on the side where the swelling portion 20 is present is formed along the inclined surface 20S of the swelling portion 20. An opening is provided in the inclined surface 20S, and the receiver 6B (see FIG. 3) is disposed in the opening. The opening in the inclined surface 20S is closed by a filter member 24, which transmits infrared light but blocks visible light.

An opening is formed through the bottom of the recessed portion 2d, and a focus adjustment lever 364L, with which the projection lens 36, which forms the optical unit 3 and will be described later, is provided, is exposed through the opening and disposed in the recessed portion 2d. The lever 364L is so formed that the front end thereof does not extend off the upper surface portion 2U.

The lamp lid 23 is provided in a position shifted toward the rear surface side and the right-side end of the upper surface portion 2U and opened and closed when the light source apparatus 31 is exchanged.

An air intake port 2i, through which outside air is introduced, is provided in the left side surface portion 2L, as shown in FIG. 2. A dust filter 25 is disposed inside the air intake port 2i.

The right side surface portion 2R, which will not be illustrated in detail, is provided with an air exhaust port through which heated air in the exterior enclosure 2 is exhausted out thereof.

The rear surface portion 2B is provided with a plurality of holes, and the front end of each of the plurality of input terminals 5 is exposed through the corresponding one of the holes. A variety of types of information outputted from an external image output apparatus (not shown) are delivered through the input terminals 5 to the controller.

The bottom surface portion 2T is provided with legs 26, which come into contact with an installation surface when the projector 1 is installed on a table or any other object, and an attachment portion (not shown) to which a fixture is attached when the projector 1 is hung from a ceiling or any other surface.

The legs 26 are formed of two legs 26B (see FIG. 2), which are disposed in positions in the vicinity of the right and left ends on the rear side, and a leg 26F (see FIG. 1), which is disposed in a central portion in the rightward/leftward direction on the front side.

The controller includes a CPU (central processing unit), a ROM (read only memory), a RAM (random access memory), and other components, functions as a computer, and controls the action of the projector 1.

The optical unit 3 optically processes a light flux outputted from the light source apparatus 31 and projects the processed light flux under the control of the controller.

The optical unit 3 includes the light source apparatus 31, an optical integration illumination system 32, a color separation system 33, a relay system 34, an optical apparatus 35, the projection lens 36, and an optical part enclosure 37, which arranges the members described above in predetermined positions along the optical path, as shown in FIG. 3.

The light source apparatus 31 includes a discharge-type light source 311 formed, for example, of an ultrahigh-pressure mercury lamp or a metal halide lamp, a reflector 312, a parallelizing lens 313 as a light transmissive member, and a light source enclosure 314, which accommodates the members described above, as shown in FIG. 3.

In the light source apparatus 31, the reflector 312 reflects light fluxes emitted from the light source 311, the parallelizing lens 313 then aligns the directions of the reflected light fluxes with each other, and the aligned light fluxes are directed toward the optical integration illumination system 32.

The optical integration illumination system 32 includes a first lens array 321, a second lens array 322, a polarization conversion element 323, and a superimposing lens 324, as shown in FIG. 3.

The first lens array 321 has a plurality of lenslets and divides the light from the light source apparatus 31 into a plurality of sub-light fluxes. The second lens array 322 and the superimposing lens 324 collect the plurality of sub-light fluxes from the first lens array 321 and superimpose them on one another on each light modulator 351, which forms the optical apparatus 35 and will be described later. The polarization conversion element 323 includes a polarization separation film and a wave plate and aligns the directions of the randomly polarized light fluxes having exited out of the light source apparatus 31 with one another to form a polarized light flux having a predetermined polarization direction.

The color separation system 33 includes two dichroic mirrors 331 and 332 and a reflection mirror 333 and has a function of separating the light flux having exited out of the optical integration illumination system 32 into three color light fluxes, red light (hereinafter referred to as "R light"), green light (hereinafter referred to as "G light"), and blue light (hereinafter referred to as "B light").

The relay system 34 includes a light-incident-side lens 341, a relay lens 343, and reflection mirrors 342 and 344 and has a function of guiding the separated R light from the color separation system 33 to a light modulator 351 for R light. The optical unit 3 has a configuration in which the relay system 34 guides the R light, but the relay system 34 does not necessarily guide the R light but may instead guide the B light.

The optical apparatus 35 includes a light modulator 351 provided for each of the color light fluxes (reference character 351R denotes light modulator for R light, reference character 351G denotes light modulator for G light, and reference character 351B denotes light modulator for B light) and a cross dichroic prism 352 as a light combining optical apparatus.

Each of the light modulators 351 includes a transmissive liquid crystal panel, a light-incident-side polarizer disposed on the light incident side of the liquid crystal panel, and a light-exiting-side polarizer disposed on the light exiting side of the liquid crystal panel and modulates the corresponding color light flux in accordance with image information.

The cross dichroic prism 352 is formed by bonding four rectangular prisms and therefore has a roughly square shape in a plan view, and two dielectric multilayer films are formed along the interfaces between the bonded rectangular prisms. The cross dichroic prims 352, in which the dielectric multilayer films reflect the R light and the B light modulated by the light modulators 351R and 351B and transmit the G light modulated by the light modulator 351G, combines the three color modulated light fluxes with one another.

The projection lens 36 is formed of a plurality of lenses arranged along an optical axis 36Ax and enlarges and projects the light having exited out of the cross dichroic prism 352 on the screen.

Figure 4:
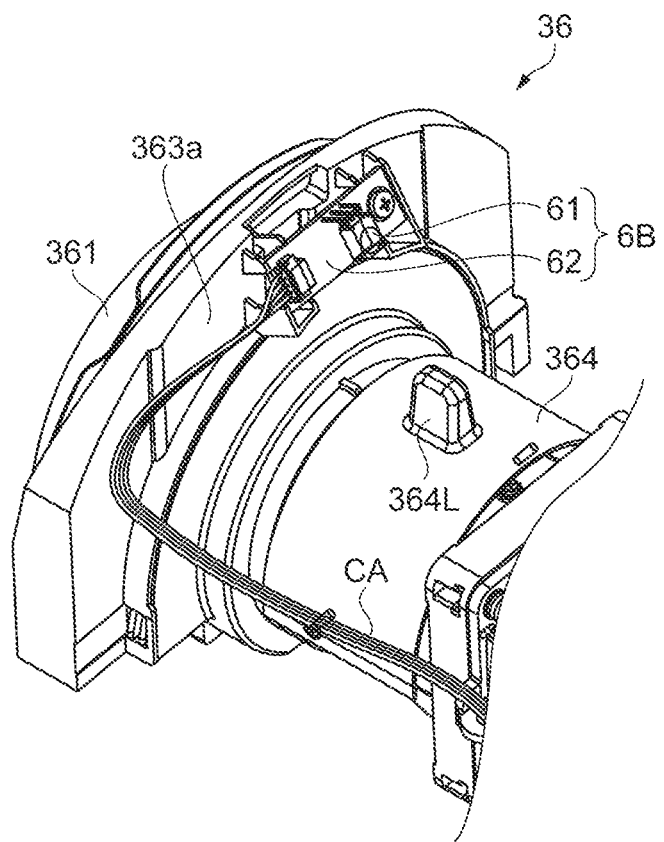
FIG. 4 is a perspective view showing a projection lens and a receiver in the embodiment.
Figure 5:
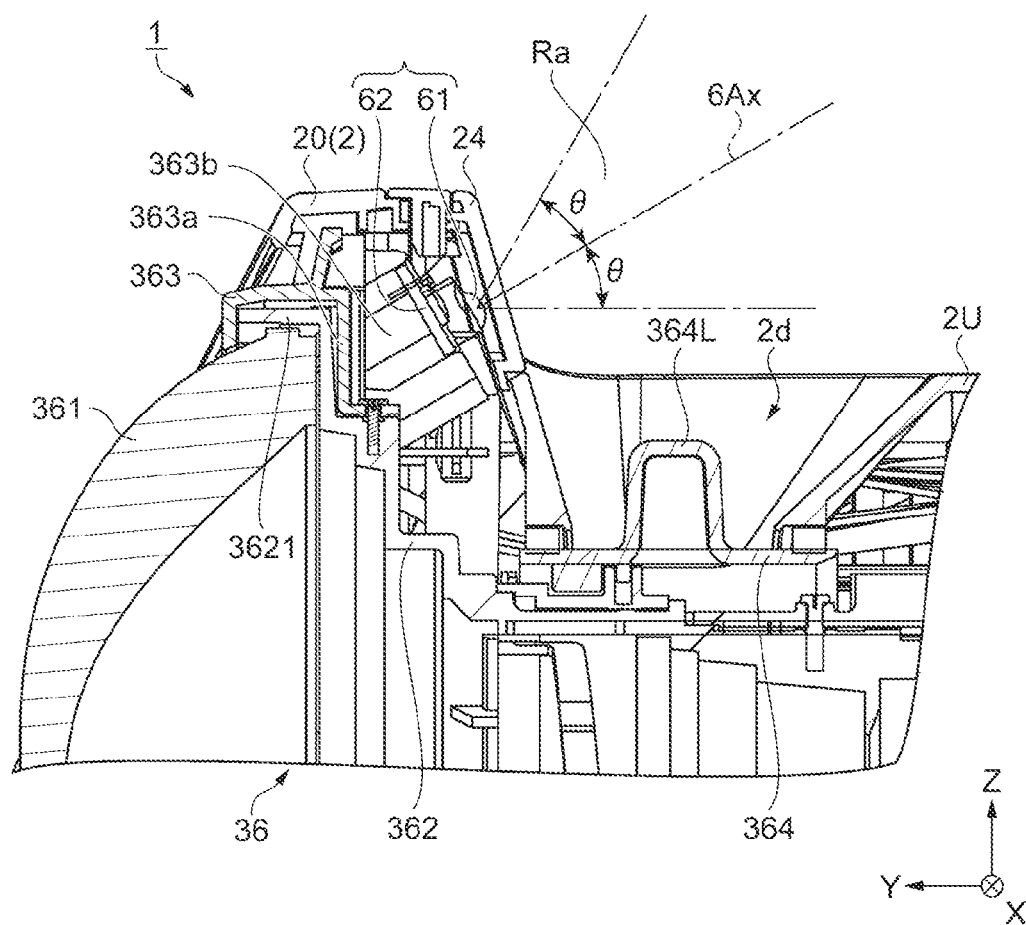
FIG. 5 is a cross-sectional view of part of the projector in the vicinity of a swelling portion in the embodiment.

FIG. 4 is a perspective view showing the projection lens 36 and the receiver 6B. FIG. 5 is a cross-sectional view of part of the projector 1 in the vicinity of the swelling portion 20.

The projection lens 36 has the front-side lens 361, which is located on the most downstream side (frontmost side) among the plurality of lenses, a guide barrel 362, a lens frame 363, a focus ring 364, and other parts, as shown in FIGS. 4 and 5.

The front-side lens 361 is a lens that contributes to a shorter focal length and a wider angle and has the largest diameter among the plurality of lenses. The front-side lens 361 has a truncated shape with no lower end portion, and light incident on the projection lens 36 is caused to exit in an obliquely upward direction through the front-side lens 361. The projector 1, which has a configuration in which the projection lens 36 has the front-side lens 361, which contributes to a shorter focal length and a wider angle, can be installed in a position in the vicinity of the projection surface or allows proximity projection.

The guide barrel 362 has a holder 3621, which holds the circumferential edge of the front-side lens 361, and accommodates a plurality of lenses (not shown) disposed on the light incident side of the front-side lens 361.

The lens frame 363 is so formed that it covers the circumferential edge of the holder 3621 and fixed to the holder 3621. The lens frame 363 in turn also covers a circumferential edge portion of the front-side lens 361. The lens frame 363 has a front side part of which is exposed through the exterior enclosure 2 and a rear side to which the receiver 6B is attached. That is, the swelling portion 20 covers part of the circumferential edge portion of the front-side lens 361 (upper side of circumferential edge portion) via the holder 3621 and the lens frame 363. A structure that allows attachment of the receiver 6B will be described later in detail.

The focus ring 364 is formed in a tubular shape, and the lever 364L, which protrudes upward, is provided on the outer circumferential surface of the focus ring 364, as shown in FIG. 4. The lever 364L is disposed in the recessed portion 2d of the exterior enclosure 2, that is, behind the swelling portion 20, as described above. When a user grasps the lever 364L and rotates the focus ring 364, a lens that contributes to focus adjustment is so moved that focus adjustment is achieved. Zoom adjustment in the projector 1 according to the present embodiment is electronically performed, that is, an image is enlarged and reduced by image processing. The zoom adjustment is performed through operation of the input operation section 4 or the remote control for remote operation of the projector 1.

Referring back to FIG. 1, the input operation section 4 includes a first operation section 41, a second operation section 42, and a third operation section 43.

The first operation section 41 has a mute switch key 41a, which switches a display mode of a projected image, that is, stops or restarting displaying the image. The mute switch key 41a is pressed-down key and disposed on the right (+X direction) side of the swelling portion 20. Further, the mute switch key 41a is located above the leg 26F or in a position where the projector 1 remains steady when the mute switch key 41a is pressed down when operated.

The second operation section 42 is formed of a plurality of pressed-down operation keys arranged in a portion on the left (−X direction) side of the lamp lid 23 as shown in FIG. 1. Specifically, the second operation section 42 is formed of a power key 42a, which switches the state of the power supply between ON and OFF, an input switch key 42b, which selects one of the plurality of input terminals 5, a menu key 42c, which allows a menu setting image and other images to be displayed, four cursor keys 42d, which are used, for example, to select specify a setting item in the menu setting image and other images, a finalizing key 42e, which finalizes the selected setting item, a return key 42f, which causes the current operation screen to return to a preceding operation screen, and a help key 42g, which allows a trouble handling method to be shown.

The third operation section 43 has a trapezoidal distortion correction key 43a, which is disposed behind the recessed portion 2d and operated in a slidable manner, as shown in FIG. 1.

The trapezoidal distortion correction key 43a is operated to correct a projected image so trapezoidally distorted that the right and left sides of the image differ from each other in terms of length. The trapezoidal distortion correction key 43a is slidable in the rightward/leftward direction and provides a variable amount of correction according to the amount of slide. To correct a projected image so trapezoidally distorted that the upper and lower sides of the image differ from each other in terms of length, two of the four cursor keys 42d are used.

The input terminals 5 include input terminals to which an image signal, a voice signal, and other signals can be inputted (for example, terminals that comply with HDMI (registered trademark) standard, video terminals, and audio terminals) from an external apparatus (such as computer and video player).

Each of the receivers 6F and 6B receives an optical signal (infrared-light operation signal) issued from the remote control and outputs an electric signal according to the received optical signal to the controller.

The receiver 6F is disposed in the opening 2b (see FIG. 1), as described above, and receives an optical signal incident from the side where light is projected through the projection lens 36, that is, an optical signal incident from a position in front of the projector 1.

The receiver 6B is disposed in the swelling portion 20 (see FIG. 1) and so oriented that it receives an optical signal incident from the side opposite to the side where light is projected through the projection lens 36. That is, the receiver 6B receives an optical signal incident from a position behind the projector 1.

The detector 7, although not illustrated in detail, includes an imager 71 and a transmitter 72, as shown in FIG. 3.

The imager 71 includes, for example, a CCD (charge coupled device), a CMOS (complementary metal oxide semiconductor) device, or any other imaging device (not shown) and captures an image of the projection surface as a subject. The imager 71 further detects infrared light emitted from a pointing tool (electronic pen, for example) operated over the projection surface and outputs detected information to the controller. The controller instructs projection of a superimposed image formed of image information on which the trajectory of the pointing tool is superimposed on the projection surface based on a result of the detection from the imager 71.

The transmitter 72 periodically issues an optical signal (infrared-light signal) to control the pointing tool operated over the projection surface. The pointing tool emits infrared light in synchronization with the optical signal issued from the transmitter 72.

Configuration of Receiver

The configuration of the receiver 6B and the structure that allows attachment of the receiver 6B will be described with reference to FIGS. 4 and 5.

The receiver 6B includes a light receiving device 61 and a circuit substrate 62, on which the light receiving device 61 is mounted, and is attached to the lens frame 363, as described above.

The lens frame 363 has a standing wall 363a, which is located behind (on the −Y-direction side of) the holder 3621, and a protrusion 363b, which protrudes obliquely upward, is formed on the standing wall 363a, as shown in FIG. 5.

The receiver 6B is fixed to the protrusion 363b with a screw inserted into a hole (not shown) provided in the circuit substrate 62. That is, the receiver 6B is fixed in a position behind (on the −Y-direction side of) an upper circumferential edge portion of the front-side lens 361.

In the standing attitude of the projector 1, the receiver 6B is so disposed that it receives an optical signal issued from an obliquely upward position behind the projector 1. Specifically, the light receiving device 61 has a directional characteristic and is so disposed that a central axis 6Ax of the area over which the light receiving device 61 has the directional characteristic, that is, the center of a reception area over which the light receiving device 61 can receive an optical signal separates away from the projector 1 by a greater distance as the central axis 6Ax extends farther away from the swelling portion 20. In other words, in the standing attitude of the projector 1, the receiver 6B is so disposed that it receives an optical signal issued from a position on and around the central axis 6Ax, the rear side of which is inclined obliquely upward. The receiver 6B in the present embodiment is so attached to the lens frame 363 that the angle of the central axis 6Ax with respect to the X-Y plane (attachment angle) is about 30°.

Further, the light receiving device 61 has maximum reception sensitivity along the central axis 6Ax, and the reception sensitivity lowers as the angle with respect to the central axis 6Ax increases. Specifically, the light receiving device 61 on the present embodiment is formed of a device having a directional angle θ of about 30°. The directional angle θ (see FIG. 5) used herein is an angle where the signal receivable distance is one-half of that along the central axis 6Ax. The receiver 6B is then so disposed that the area around the central axis 6Ax but within the directional angle θ (hereinafter referred to as "reception area Ra") is located above the upper surface portion 2U. The lever 364L, which does not extend off the upper surface portion 2U, is, of course, located in a position outside a predetermined area (reception area Ra).

The receiver 6B may instead be attached at an attachment angle different from 30°. Further, the light receiving device 61 may instead be a device having a directional angle θ different from 30°.

The receiver 6B is connected to the controller via a cable CA, as shown in FIG. 4. The receiver 6B, specifically, the light receiving device 61 receives an optical signal transmitted from the remote control operated by the user behind the projector 1 and outputs an electric signal according to the received optical signal to the controller. The controller controls the projector 1 based on the electric signal outputted from the receiver 6B.

Figure 6:
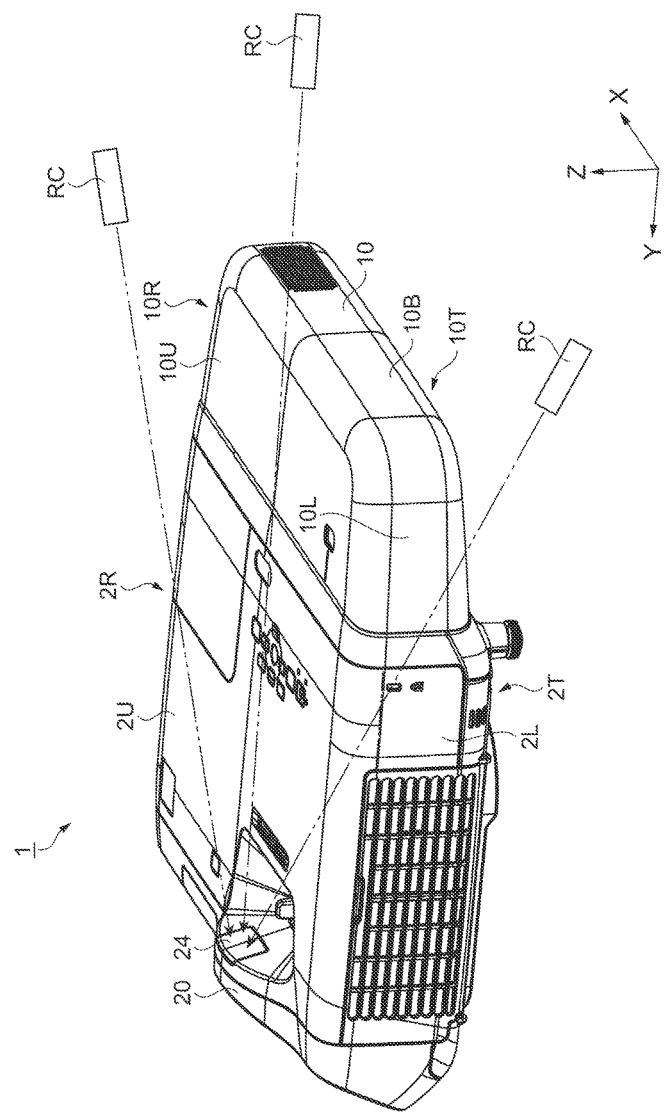
FIG. 6 shows the projector to which a cable cover in the embodiment is attached and a remote control located behind the projector.

FIG. 6 shows the projector 1 to which a cable cover 10 is attached and the remote control RC located behind the projector 1.

The cable cover 10 is attached to the rear surface portion 2B (see FIG. 2) of the projector 1 and covers the plurality of input terminals 5 (see FIG. 2) and cables (not shown) connected to the input terminals 5.

The cable cover 10 has an upper surface portion 10U, a left side surface portion 10L, a right side surface portion 10R, and a bottom surface portion 10T, which are so formed that they follow the upper surface portion 2U, the left side surface portion 2L, the right side surface portion 2R, and the bottom surface portion 2T of the projector 1, and a rear surface portion 10B and is formed in a box-like shape, as shown in FIG. 6. That is, the cable cover 10, when it is attached to the projector 1, is integrated with the projector 1 (exterior enclosure 2) from the viewpoint of exterior appearance.

The swelling portion 20 protrudes from the upper surface portion 10U even in a state in which the cable cover 10 is attached to the projector 1, and the reception area Ra (see FIG. 5), which is located above the upper surface portion 2U, is also located above the upper surface portion 10U. That is, even when the cable cover 10 is attached to the projector 1, the user behind the projector 1 can remotely operate the projector 1 by using the remote control RC, as in a case where the cable cover 10 is not attached to the projector 1.

The receiver 6F is configured in the same manner as the receiver 6B and disposed and so oriented that it can receive an optical signal incident from the remote control RC in a position in front of the projector 1. That is, the receiver 6F receives an optical signal issued from the remote control RC located, for example, in a position on the right or left side of the projector 1 and a position in front thereof and then reflected off the projection surface or any other object.

Further, either of the receivers 6F and 6B receives an optical signal issued from the transmitter 72 in the detector 7 in another projector 1 and outputs an electric signal according to the received optical signal to the controller. For example, when a plurality of projectors 1 are used, and each of the projectors 1 is operated by using the pointing tool, each of the projectors 1 performs synchronization of a signal for controlling the pointing tool based on a reception result from the receiver 6F or 6B. Each of the projectors 1 can thus project an image by using the pointing tool in a stable manner without malfunction resulting from a wrong pointing tool.

Although not shown, the projector 1 can be installed on a ceiling or any other surface via a fixture (not shown) in the hung attitude. In the hung attitude of the projector 1, the receiver 6B is so disposed that it receives an optical signal issued from a position on and around the central axis 6Ax the rear side of which is inclined obliquely downward.

As described above, the projector 1 according to the present embodiment can provide the following advantageous effects.

(1) The projector 1 has the receiver 6B disposed in the swelling portion 20. The configuration allows the user behind the projector 1, even when the cable cover 10 is attached to the projector 1, to remotely control the projector 1 by using the remote control RC, as in the case where the cable cover 10 is not attached to the projector 1.

Further, the cable cover 10 does not have a special shape, such as a hole or a recess for optical signal reception, or is not provided with a member or any other portion that transmits an optical signal but is so formed that the cable cover 10 is attached to the projector 1 (exterior enclosure 2) integrally therewith from the viewpoint of exterior appearance. The exterior appearance of the projector 1 can therefore be improved even when the cable cover 10 is attached thereto. Further, since the receiver 6B is disposed by using the swelling portion 20 formed in correspondence with the front-side lens 361, the receiver 6B can be disposed without degradation in the exterior appearance of the projector 1.

(2) Since the receiver 6B is so disposed that it is inclined as described above, in the standing attitude in which the projector 1 is installed on a desktop or any other surface, the receiver 6B receives an optical signal issued from an obliquely upward position behind the projector 1 and positions therearound, whereas in the hung attitude, the receiver 6B receives an optical signal issued from an obliquely downward position behind the projector and positions therearound. The receiver 6B can therefore reliably receive an optical signal issued when the remote control RC is operated by a viewer of a projected image both in the standing attitude and the hung attitude of the projector 1.

(3) Since the receiver 6B is attached to the lens frame 363, the receiver 6B and the projection lens 36 can be manufactured integrally with each other and then disposed in the exterior enclosure 2. The cable CA to be connected to the receiver 6B can therefore be readily wired or otherwise processed, whereby the projector 1 can be manufactured in a simplified manner.

(4) Since the lever 364L is located in a position outside the reception area Ra, the receiver 6B can reliably receive an optical signal from the rear surface side even when focus adjustment is performed.

(5) Each of the receivers 6F and 6B has a function of receiving an optical signal issued from the transmitter 72 in the detector 7 in another projector 1 and outputting an electric signal according to the received optical signal to the controller. Therefore, even when a plurality of projectors 1 to each of which the cable cover 10 is attached are used by using the pointing tools, synchronization of signals for reliably controlling the pointing tools of the projectors 1 can be reliably performed.

Variations

The embodiment described above may be changed as follows.

The projector 1 according to the embodiment described above includes the detector 7, and a projector including no detector 7 may be provided.

The receiver 6B in the embodiment described above is configured to receive an optical signal issued from the remote control RC or the transmitter 72 in the detector 7. Instead, the receiver 6B may be configured to receive an optical signal issued from a device other than the remote control RC or the transmitter 72.

The receiver 6B in the embodiment described above is configured to be attached to the projection lens 36. Instead, the receiver 6B may be attached to the exterior enclosure 2, for example, a member thereof in which the filter member 24 is disposed.

In the embodiment described above, the receiver 6B is disposed in a position behind (on the −Y-direction side of) the upper circumferential edge portion of the front-side lens 361. Instead, the receiver 6B may be disposed in a position above (on the +Z-direction side of) the upper circumferential edge portion of the front-side lens 361.

The projector 1 according to the embodiment described above is configured to electronically perform zoom adjustment. Instead, a zoom adjustment mechanism that allows zoom adjustment may be accommodated in the projection lens 36. In this case, the zoom adjustment mechanism may be provided with a lever for zoom adjustment, and the lever may be disposed in a position outside the reception area Ra.

The projector 1 according to the embodiment described above uses a transmissive liquid crystal panel as each of the light modulators but may instead use a reflective liquid crystal panel. Still instead, a micromirror-type light modulator, such as a DMD (digital micromirror device), may be used as each of the modulators.

The light modulators in the embodiment described above employ what is called a three-panel method using three light modulators corresponding to the R light, the G light, and the B light but do not necessarily employ the three-panel method and may instead employ a single-panel method. The invention can even be applied to a projector including two light modulators or four or more light modulators.

The light source apparatus 31 does not necessarily use the discharge-type light source 311 and may be formed of a light source based on a different method, a light emitting diode, a laser, or any other solid-state light source.

The entire disclosure of Japanese Patent Application No. 2014-133751, filed Jun. 30, 2014 is expressly incorporated by reference herein.

What is claimed is:

1. A projector comprising:
   a light source;
   a light modulator that modulates light emitted from the light source in accordance with image information;
   a projection lens having a plurality of lenses and projects the modulated light from the light modulator;
   a receiver that externally receives an optical signal and outputs an electric signal according to the received optical signal; and
   an exterior enclosure that forms the exterior of the projector,
   wherein
      the projection lens has a front-side lens disposed in a most downstream position in an optical path among the plurality of lenses and having a diameter larger than diameters of other lenses included in the plurality of lenses,
      the exterior enclosure has an upper surface portion that faces upward in a standing attitude of the projector,
      the upper surface portion has a swelling portion that swells in such a way that the swelling portion covers part of a circumferential edge portion of the front-side lens,
      the receiver is disposed in the swelling portion and so oriented that the receiver receives the optical signal incident from a side opposite to a side where the light is projected through the projection lens, and the receiver is so inclined that a central axis of an area over which the receiver has a directional characteristic separates away from the projector by a greater distance as the central axis extends farther away from the swelling portion toward the opposite side.

2. The projector according to claim 1,
wherein the receiver is attached to the projection lens.

3. The projector according to claim 1,
wherein the projection lens is provided with a lever located on a side opposite to the swelling portion and used for at least one of focus adjustment and zoom adjustment, and the lever is located in a position outside a predetermined area containing a position in the area over which the receiver has the directional characteristic where reception sensitivity is maximized.

4. The projector according to claim 1,
wherein the receiver receives an optical signal issued from a remote control used to remotely operate the projector.

\* \* \* \* \*